US007836216B2

(12) United States Patent
Kashi et al.

(10) Patent No.: US 7,836,216 B2
(45) Date of Patent: Nov. 16, 2010

(54) CONNECTOR SYSTEM FOR SUPPORTING MULTIPLE TYPES OF PLUG CARRYING ACCESSORY DEVICES

(75) Inventors: Mostafa Kashi, Sunnyvale, CA (US); Karl Townsend, Los Altos, CA (US)

(73) Assignee: Palm, Inc., Sunnyvale, CA (US)

(*) Notice: Subject to any disclaimer, the term of this patent is extended or adjusted under 35 U.S.C. 154(b) by 481 days.

(21) Appl. No.: 11/210,328

(22) Filed: Aug. 23, 2005

(65) Prior Publication Data

US 2007/0049103 A1 Mar. 1, 2007

(51) Int. Cl.

| | |
|---|---|
| ***G06F 3/00*** | (2006.01) |
| ***G06F 13/12*** | (2006.01) |
| ***G06F 13/00*** | (2006.01) |
| ***H04R 1/10*** | (2006.01) |
| ***H01R 27/00*** | (2006.01) |
| ***H04M 1/00*** | (2006.01) |

(52) U.S. Cl. ............................ 710/15; 710/10; 710/11; 710/16; 710/62; 710/104; 381/74; 439/222; 455/569.1

(58) Field of Classification Search ...................... None
See application file for complete search history.

(56) References Cited

U.S. PATENT DOCUMENTS

| | | | | |
|---|---|---|---|---|
| 3,744,034 | A | 7/1973 | Paul | |
| 4,198,601 | A * | 4/1980 | Ono et al. | 455/73 |
| 4,860,372 | A | 8/1989 | Kuzunuki et al. | |
| 4,972,496 | A | 11/1990 | Sklarew | |
| 5,231,381 | A | 7/1993 | Duwaer | |
| 5,305,394 | A | 4/1994 | Tanaka | |
| 5,332,993 | A | 7/1994 | Ninomiya | |
| 5,349,668 | A | 9/1994 | Gladstein et al. | |
| 5,386,567 | A | 1/1995 | Lien et al. | |
| 5,389,745 | A | 2/1995 | Sakamoto | |
| 5,434,929 | A | 7/1995 | Beernink et al. | |
| 5,442,794 | A | 8/1995 | Wisor et al. | |
| 5,444,192 | A | 8/1995 | Shetye et al. | |
| 5,452,371 | A | 9/1995 | Bozinovic et al. | |
| 5,463,261 | A | 10/1995 | Skarda et al. | |
| 5,463,742 | A | 10/1995 | Kobayashi | |

(Continued)

FOREIGN PATENT DOCUMENTS

EP 0560510 A1 9/1993

(Continued)

OTHER PUBLICATIONS

Ed Nisley, "Two-Way Power Line Communication", Mar. 1992, The Computer Applications Journal, pp. 74-76,78-81.

(Continued)

*Primary Examiner*—Tariq Hafiz
*Assistant Examiner*—Henry Yu
(74) *Attorney, Agent, or Firm*—Mahamedi Paradice Kreisman LLP

(57) ABSTRACT

Embodiments of the invention include a method and apparatus for intelligent handheld device accessory support. A method of one embodiment includes sensing the presence of an accessory plug in a jack of the handheld device, determining a type of accessory device attached to the accessory plug, including receiving electrical signals from pins of the plug and based on the determination, configuring the handheld device, including assigning particular signals to pins of the plug.

28 Claims, 12 Drawing Sheets

U.S. PATENT DOCUMENTS

| | | | | |
|---|---|---|---|---|
| 5,504,908 | A | 4/1996 | Ikeda | |
| 5,528,743 | A | 6/1996 | Tou et al. | |
| 5,534,892 | A | 7/1996 | Tagawa | |
| 5,557,738 | A | 9/1996 | Townsley et al. | |
| 5,581,772 | A | 12/1996 | Nanno et al. | |
| 5,613,135 | A | 3/1997 | Sakai et al. | |
| 5,615,284 | A | 3/1997 | Rhyne et al. | |
| 5,621,817 | A | 4/1997 | Bozinovic et al. | |
| 5,630,148 | A | 5/1997 | Norris | |
| 5,648,762 | A | 7/1997 | Ichimura et al. | |
| 5,652,891 | A | 7/1997 | Kitamura et al. | |
| 5,666,256 | A | 9/1997 | Zavis et al. | |
| 5,673,357 | A | 9/1997 | Shima | |
| 5,698,822 | A | 12/1997 | Haneda et al. | |
| 5,710,931 | A | 1/1998 | Nakamura et al. | |
| 5,717,936 | A | 2/1998 | Uskali | |
| 5,754,436 | A | 5/1998 | Walsh et al. | |
| 5,758,099 | A | 5/1998 | Grieco et al. | |
| 5,781,744 | A | 7/1998 | Johnson et al. | |
| 5,783,926 | A | 7/1998 | Moon et al. | |
| 5,784,295 | A | 7/1998 | Hinohara | |
| 5,832,286 | A | 11/1998 | Yoshida | |
| 5,841,901 | A | 11/1998 | Arai et al. | |
| 5,859,522 | A | 1/1999 | Theobald | |
| 5,859,970 | A | 1/1999 | Pleso | |
| 5,946,392 | A | 8/1999 | Tague | |
| 5,948,077 | A | 9/1999 | Choi et al. | |
| 6,038,457 | A | 3/2000 | Barkat | |
| 6,069,960 | A * | 5/2000 | Mizukami et al. | 381/74 |
| 6,073,201 | A * | 6/2000 | Jolley et al. | 710/315 |
| 6,334,160 | B1 * | 12/2001 | Emmert et al. | 710/11 |
| 6,359,987 | B1 * | 3/2002 | Tran et al. | 381/58 |
| 6,457,134 | B1 | 9/2002 | Lemke et al. | |
| 6,519,475 | B1 * | 2/2003 | Kim | 455/557 |
| 6,523,124 | B1 | 2/2003 | Lunsford et al. | |
| 6,594,366 | B1 * | 7/2003 | Adams | 381/74 |
| 6,665,803 | B2 | 12/2003 | Lunsford et al. | |
| 6,970,752 | B1 * | 11/2005 | Lim et al. | 700/94 |
| 6,988,905 | B2 * | 1/2006 | Corey et al. | 439/222 |
| 7,103,381 | B1 | 9/2006 | Wright et al. | |
| 7,130,184 | B2 * | 10/2006 | Choi | 361/679.23 |
| 7,152,190 | B2 | 12/2006 | Overtoom | |
| 7,329,136 | B2 | 2/2008 | Su et al. | |
| 7,330,215 | B2 * | 2/2008 | Ito | 348/375 |
| 7,340,284 | B2 * | 3/2008 | Chung | 455/569.1 |
| 2002/0091953 | A1 | 7/2002 | Min | |
| 2003/0232648 | A1 | 12/2003 | Prindle | |
| 2004/0019732 | A1 | 1/2004 | Overtoom et al. | |
| 2004/0032394 | A1 * | 2/2004 | Ayatsuka et al. | 345/156 |
| 2005/0064905 | A1 * | 3/2005 | Pinder | 455/557 |
| 2005/0078935 | A1 | 4/2005 | Sun | |
| 2006/0033809 | A1 | 2/2006 | Farley | |
| 2006/0047982 | A1 | 3/2006 | Lo et al. | |
| 2006/0068910 | A1 * | 3/2006 | Schmidt et al. | 463/40 |

FOREIGN PATENT DOCUMENTS

| | | | |
|---|---|---|---|
| EP | 0861008 | A1 | 8/1998 |
| WO | WO2007/135522 | A2 | 11/2007 |

OTHER PUBLICATIONS

On-The-Go Supplemental to the USB 2.0 Specification, USB Implementers Forum, Inc. (USB-IF), 81 pages, dated Apr. 4, 2006.

USB 2.0 Specification, 650 pages, dated Apr. 27, 2000.

USB 2.0 Specification Engineering Change Notice (ECN) #1: Mini-B connector, 45 pages, dated Oct. 20, 2000.

* cited by examiner

FIG.2
(PRIOR ART)
| | |
|---|---|
| 2.5mm plug | 3.5mm plug |
| Cellphone headset | Stereo headphones |
| Car kit | Amplified PC multimedia speakers |
| Combination headset/stereo headphone | Powered noise-canceling headphone |
| Custom stereo headphone w/2.5mm plug | |
Headset connections
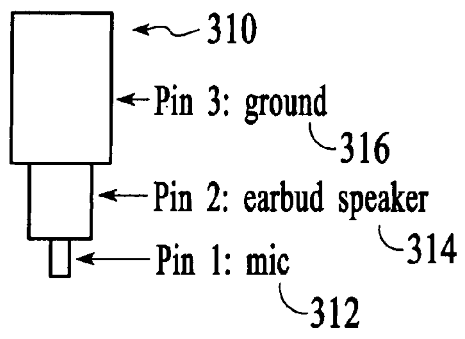
FIG.3A
Headphone connections
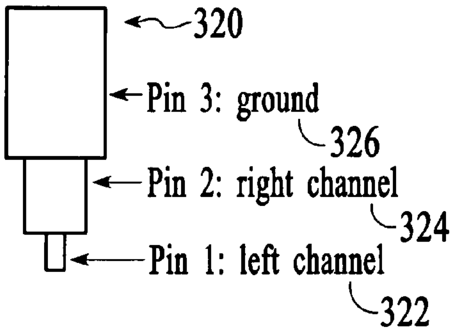
FIG.3B
Combo headset/headphone
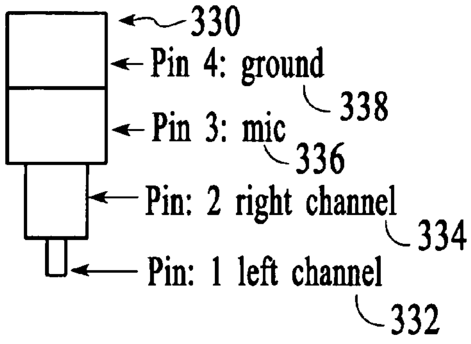
FIG.3C

800

Detection for audio accessory voltage level table

| Accessories | Signal 1 voltage (EXT_MIC1_IRQ) | Signal 3 voltage (EXT_MIC2_IRQ) | Signal 2 voltage (HS_INPUT) | Signal 1-Signal 2 |
|---|---|---|---|---|
| Stereo 8Ω | 0.010756 | GND | 0.005527 | 0.005229 |
| Stereo 32Ω | 0.042506 | GND | 0.021974 | 0.020533 |
| Stereo 150Ω | 0.18811 | GND | 0.1 | 0.08811 |
| Stereo 1kΩ | 0.89404 | GND | 0.55102 | 0.343019 |
| Stereo 2kΩ | 1.336634 | GND | 0.915254 | 0.421379 |
| Stereo 3kΩ | 1.600791 | GND | 1.173913 | 0.426877 |
| Stereo 5kΩ | 1.901408 | GND | 1.516854 | 0.384555 |
| Stereo 10kΩ | 2.213115 | GND | 1.942446 | 0.270669 |
| Stereo 20kΩ | 2.410714 | GND | 2.259414 | 0.1513 |
| Stereo 50kΩ | 2.54717 | GND | 2.504638 | 0.042532 |
| Stereo 100kΩ | 2.596154 | GND | 2.598653 | 0.005229 |
| 3 pole headset | 1.336634 | GND | 0V | 1.336634 |
| 4 pole headset | 0V | 1.22 | 0V | 0 |

FIG.8

CONNECTOR SYSTEM FOR SUPPORTING MULTIPLE TYPES OF PLUG CARRYING ACCESSORY DEVICES

TECHNICAL FIELD

Embodiments of the invention relate to connectors and mechanisms for transferring data between devices. In particular, embodiments of the invention relate to a connector system for supporting different types of plug carrying accessory devices.

BACKGROUND

As devices become more universal in the type of functions they support, the range of external media accessories becomes increasingly diverse as well. For example, devices with cellular capabilities may include media players for use with music or video files. In order to take full advantage of the capabilities of such devices, the user typically needs to use more than one accessory device. For example, a cellular telephone device may accommodate a headset with a microphone, but that same headset may not be suitable for music listening. The user may need to switch from headset to ear buds in order to enjoy music on the same device.

Plug connectors (commonly referred to as "plugs") are typically used to connect computing devices with accessory devices, particularly when audio or video data is involved. FIG. 1A and FIG. 1B illustrate different kinds of conventional plug connectors 100. Plug connectors 100 are generally characterized by a barrel 110 that inserts into a plug receptacle. An insulative body 120 may support the barrels 110 and provide a surface for the user to insert and remove the plug connector. The barrel 110 may include pins 112 or electrical leads that carry signals to and/or from the device to the accessory. In FIG. 1A, the plug 100 corresponds to a 3-pin plug. FIG. 1B shows an alternative 4-pin plug 150. The plug connectors 100, 150 can be inserted into receptacle connectors where the pins of the plug connectors align with corresponding pins (sometimes called "poles") of the receptacle.

The difference between the 3-pin plug 100 of FIG. 1A and the 4-pin plug 150 of FIG. 1B is the presence of an extra pin 122 at the base of the 4-pin plug (FIG. 1B). When a comparison is made between the plug connectors of FIG. 1A and FIG. 1B, the pins 1, 2, and 3 are relatively aligned, but pin 4 on plug B "overlaps" pin 3 on plug A.

In addition to pin configuration, the plug connectors of FIG. 1A and FIG. 1B may be of different dimensions. The dimension of a plug connector is often is a measurement of girth of the barrel 110. For example, in FIG. 1A the plug connector 100 includes a 2.5 mm barrel 110, and in FIG. 1B, the plug connector 150 includes is a 3.5 mm barrel 160. For dimensions are fairly standard in existing plug connectors.

FIG. 2 shows some common conventions for signal connection to connectors. Some accessories also include an "answer" button on the microphone signal and/or selector switch to distinguish between a headset and a headphone operation.

An inherent difficulty in supporting the different kinds of plug accessories with one device is connector compatibility. For example, media plugs that connect certain accessories to mobile computing devices differ in physical dimensions, number of contacts (or "pins"), and electrical signal connectivity. Adapters exist for mating plug connectors of one pin configuration and/or dimension into a receptacle for another kind of plug connector or pin configuration. However, such adapters often do not fully support the connected plug connector. For example, many times, a 3-pin plug can plug into a 4-pole jack using an adapter. However, the extra pin will be shorted to pin 3, causing the accessory to operate improperly.

Mobile computing devices in the form of smart phones and wireless messaging devices often have the most use for plug connectors. Accessories for such devices often have many added functions. For example, headsets with microphones often have an "answer" button that can be actuated to communicate a signal on one of the signal lines to enable an incoming call to be picked up.

FIG. 3A to FIG. 3C illustrate examples of existing plug connectors and pin configurations commonly in use today. FIG. 3A illustrates a 3-pin plug connector 310 configured for a headset accessory. The headset accessory may correspond to a device that supports audio output and microphone capabilities. To accommodate the headset accessory, there is a first pin 312 for a microphone, a second pin 314 for an earbud, and a third pin 316 for ground. The pin configuration enables the headset accessory to be supported with monotone audio and microphone capabilities.

FIG. 3B illustrates another 3-pin connector plug 320 configured for a headphone accessory. The headphone accessory may correspond to a device that supports audio, preferably in stereo. The pin configuration provided includes (i) a first pin 322 for a left audio channel, (ii) a second pin 324 for a right channel audio, (iii) a third pin 326 for ground.

FIG. 3C illustrates a 4-pin connector plug 330, configured as a combination headphone/headset accessory device. The pin configuration includes (i) a first pin 332 for a left audio channel, (ii) a second pin 334 for a right audio channel, (iii) a third pin 336 for a microphone, and (iv) a fourth pin 338 for ground. Typically, the 4-pin connector plug 330 uses the thicker 3.5 mm barrel.

A standard and commonly-available adapter exists for adapting from 3.5 mm to 2.5 mm. FIG. 3D is a diagram that shows the use of such an adapter 380. The adapter does not distinguish between what kind of signals are to be carried (e.g. stereo headphones, powered noise-canceling headphones or amplified multimedia speakers). As such, adapters 380 do not generally enable full support of all adapted accessory devices. Moreover, adapters that convert pin count (e.g. 4-pin to 3-pin) are not commonly available.

BRIEF DESCRIPTION OF THE DRAWINGS

FIG. 2 is a listing of several prior art accessories and their plug configurations, FIG. 3A, FIG. 3B and FIG. 3C are diagrams of different pin assignment configurations for prior art accessory plugs.

FIG. 8 illustrates a look-up table for identifying the type of accessory device that uses the plug connector inserted into a receptacle connector, such as provided in FIG. 7.

DETAILED DESCRIPTION

Figure 1A:
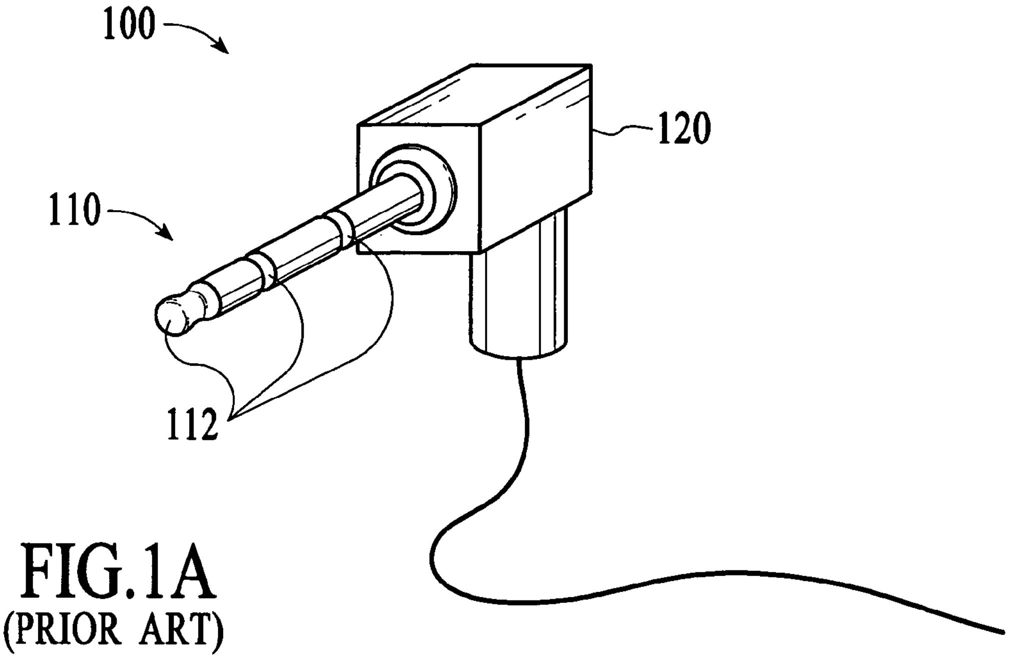
FIG.1A (PRIOR ART)
FIG. 1A and FIG. 1B are illustrations of prior art plug connectors.

Embodiments described herein provide a connector system for supporting multiple types of plug carrying accessory devices. In particular, embodiments described herein enable a computing device to receive plug connectors having different pin sizes (e.g. three or four pins) and different pin configurations. As such, the computing device can support numerous types of plug sizes, configurations, and accessory device functions through use of a connector system such as shown and described by embodiments of the invention.

According to one or more embodiments, a universal connector system is provided for enabling a computing device to receive a plug connector of an accessory device, and to determine information about the accessory device. By determining information about the accessory device, embodiments described herein provide for the computing device to configure its connector system to fully support the inserted plug connector and attached accessory device.

As will be described, the connector system may include a receptacle connector (alternatively referred to as "receptacle" or "jack") having physical dimensions that are conventional. One or more embodiments provide for circuit elements to be provided with signal lines that extend to the jack. The circuit elements enable detection and measurement of electrical characteristics that result from insertion of a plug into the jack. The resulting electrical characteristics may be correlated to information about the accessory device that uses the inserted plug. This information may be used to configure the computing device, and the connector system in particular. For example, signal lines may be assigned to carry audio data, microphone data and ground, based on the detected electrical properties measured on the signal lines that result from the plug being inserted.

In one embodiment, a computing device may be operated in which an accessory device plug is detected as it is mated with a receptacle connector of the computing device. Information is determined about the accessory device that uses the plug from electrical properties or characteristics produced on one or more signal lines that extend to the receptacle connector. The computing device is then configured to accommodate the accessory device using the determined information.

In another embodiment, a connector system is provided that includes a receptacle configured to receive a plug connector of an accessory device. A measurement module is configured to measure one or more electrical characteristics off of one or more signal lines that extend from the receptacle upon insertion of the plug connector into the receptacle. Additionally, a knowledge module is configured to generate configuration data for a processor of the computing device. The configuration data may be determined from data corresponding to the one or more electrical characteristics measured by the measurement module. The configuration data indicates a use of one or more of the signal lines that extend from the receptacle.

In another embodiment, a computing device is provided having a receptacle that is configured to receive a plug connector of an accessory device. A plurality of signal lines may be included which extend to the receptacle. Additionally, one or more processors may be provided, which are configured to: (i) energize at least one of the plurality of signal lines prior to insertion of the plug connector; and (ii) identify information about the accessory device based on a measured electrical characteristic on one or more of the plurality of signal lines. The measured electrical characteristic may be a result of the at least one of the plurality of signal lines being electrically connected with a pin of the plug connector upon insertion of the plug connector into the receptacle.

As used herein, the term "universal" means operable with many or several kinds. A universal system for receiving and supporting plug connectors means a system that can receive and fully support multiple kinds of plug connectors, including plug connectors of different types, functionality, characteristics and properties.

Reference may be made in this application to the term "substantially equal." As used herein, the expression means that two or more quantities are within 80% of one another, unless explicitly stated to be a greater correlation value (e.g. 90% or 95% or 99%).

Embodiments of the invention may be implemented to handle accessory devices that include mono-aural cell phone headsets (earbud speaker and in-line microphone), stereo headphones, powered noise-reduction headphones, amplified stereo speakers (computer multimedia system), car kit, stereo headphone/headset combination, and many others. In particular, embodiments described herein provide for a device that can handle some (e.g. two or more) or all of the accessory devices listed above.

One or more embodiments described herein may be implemented using modules. A module may include a hardware, software, firmware, or combinations thereof, that cooperate or combine to perform a stated task or function.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

System Overview

Figure 5:
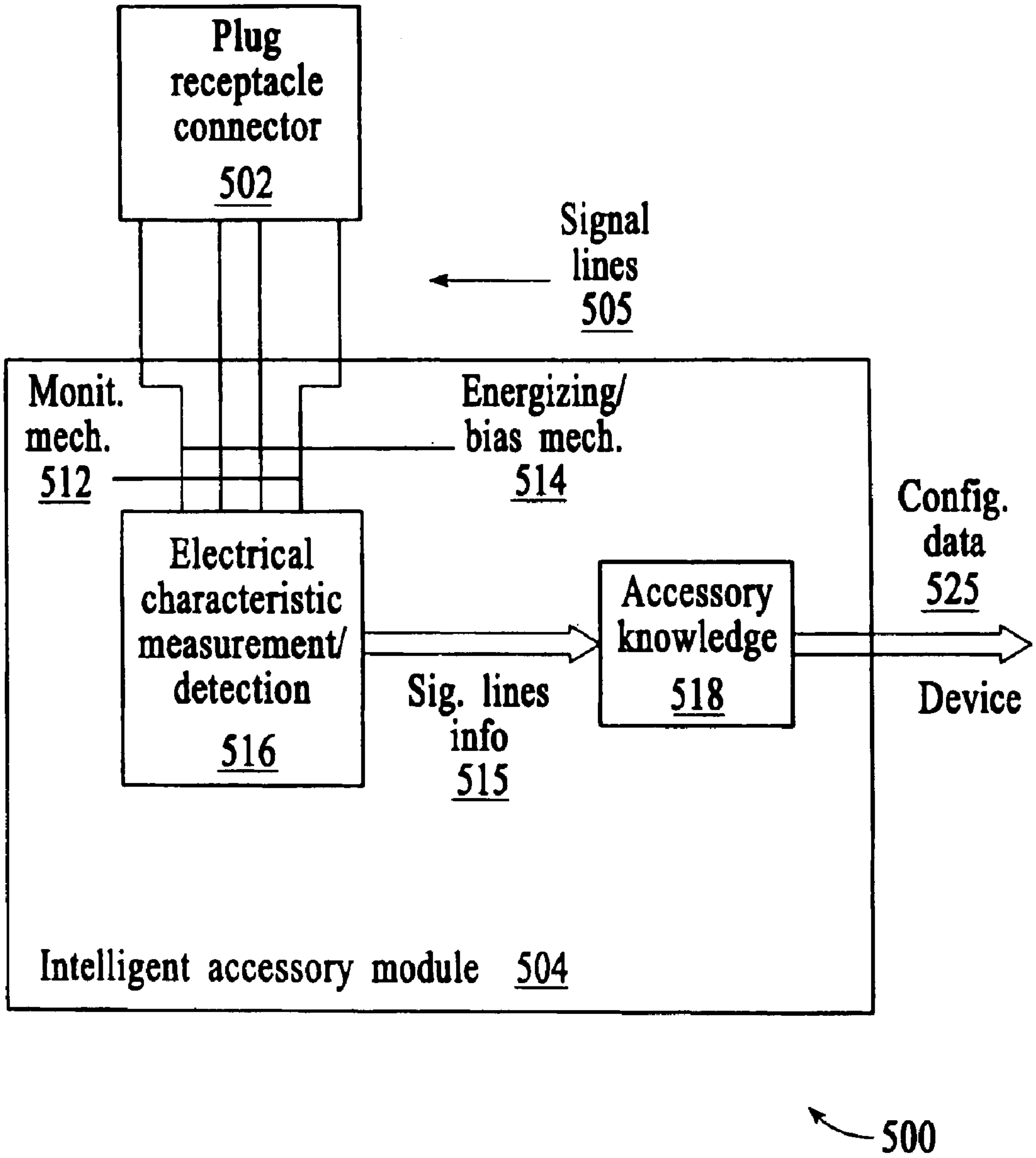
FIG. 5 is a block diagram of a universal connector system for supporting plug connectors, according to an embodiment of the invention.

FIG. 5 is a block diagram of a universal connector system for supporting plug connectors, according to an embodiment of the invention. A system 500 as shown and described in FIG. 5 may be implemented on numerous platforms and devices. An embodiment contemplates use of system 500 on mobile or small form factor devices, such as, for example, on a personal digital assistant (PDA) (such as the TUNGTEN E manufactured by PALM, Inc.), a smart phone (such as the TREO 650, manufactured by PALM, Inc.), a cellular phone (such as manufactured by NOKIA INC.) or a musical device player (such as for playing MP3 files). However, numerous other types of computing devices carry or may be configured to carry receptacles for plug connectors, such as desktop computers and laptops. Many times, a device incorporating an embodiment of the invention has multiple functions, such as cellular and musical capabilities (thus increasing the need for a universal receptacle for plug connectors). Additional examples of devices on which embodiments of the invention may be implemented include those that operate the PALM OS (manufactured by PALMSOURCE INC.) or POCKET PC (manufactured by MICROSOFT CORP.). It is also possible for embodiments of the invention to be implemented on other types of devices, such as, for example, laptop computers and stationary computers.

The system 500 includes a receptacle connector 502 from which a plurality of signal lines 505 are extended. An intelligent accessory module 504 connects to the signal lines 505. The intelligent accessory module 504 enables the signal lines 505 to be used to detect plug connectors inserted into the jack 502, as well as information about the accessory device that is using the plug connector. According to an embodiment, the intelligent accessory module 504 uses information determined about the accessory device to provide data for configuring the device on which the system 500 resides. The device can then configure itself to handle the different properties of the accessory device, as well as the different functionality that the accessory device may provide.

In an embodiment, components of the intelligent accessory module 504 include a monitoring mechanism 512, an energizing/bias element 514, an electrical characteristic measurement/detection component (ECMD) 516, and an accessory knowledge component 518. The monitoring mechanism 512 and the energizing/bias element 514 operate off the signal lines 505 that extend from the jack 502. Upon insertion of a plug connector into the jack 502, changes to the electrical properties of the signal lines 505 are detected and measured by the ECMD 516. Signal line information 515 is then used by the accessory knowledge component 518. The accessory knowledge component 518 correlates the signal line information 515 to specific information about the accessory device plugged into jack 502. This specific information may enable configuration data 525 to be identified from the accessory knowledge component 518. The configuration data 525 may be used by a processor of the computing device to configure its use of the signal lines 505, particularly with respect to how the signal lines are used (e.g. whether they carry audio data, microphone data or nothing) for the device to configure itself. This may include configurations on how signals on signal lines 505 are to be handled, so that the accessory device of the inserted plug is fully supported and functional with the device. For example, as provided by an embodiment described below, the system 500 may configure its operations to accommodate a microphone line, and/or to use signal lines to receive audio in stereo, depending on the configuration data 525 generated.

The energizing/bias element 514 energizes and applies a bias to the signal lines 505 in the absence of insertion of a plug connector in the jack 502. The monitoring mechanism 512 detects when a plug connector is inserted into the jack 502. In one embodiment, the energizing/bias element 514 corresponds substantially to circuit and device elements that extend power, directly or indirectly, from a power source of the device on which the system runs. The monitoring mechanism 512 may correspond to a state element that detects a state change on the signal lines 505. This may correspond to hardware that detects sufficient change in the electrical properties of the signal lines 505 to signify the state change. In one implementation, the monitoring mechanism 512 may correspond to a mechanical detect switch.

In an embodiment, the ECMD component 516 measures the change in electrical properties on the signal lines 505 as a result of the insertion of the plug connector into the jack 502. In an implementation, the electrical properties that are measured (or determined) may correspond to voltage or impedance, although other properties such as current may be used. Results of the ECMD 516, in the form of signal line information 515, are used by the accessory knowledge component to determine information about the accessory device of the inserted plug connector. In one embodiment, the accessory knowledge component 518 may include a lookup table (see FIG. 8) or other data structure that enables the signal line information 515 to be correlated to specific accessory device information. The device accessory information may identify loads that may be carried on individual signal line 505. Other information, such as accessory device type and functionality may also be identified. The configuration information 525 based on the information determined from the accessory knowledge component 518 may be transmitted to relevant elements of the system 500, such as its central processor(s).

It should be noted that while the system 500 shows separated or delineated components and mechanism, when implemented, the components and mechanisms that perform the various functions described with the individual elements may overlap.

According to an embodiment, accessory devices may be identified by type or by their capabilities or properties. For example, different types or kinds of accessory devices may be distinguishable from one another by the amount of impedance (electrical resistance) that each presents to a corresponding signal pin. Each signal may be biased, such as by using a resistor network. When the accessory is plugged into the jack, the voltage present at each pin is measured by the processor of the computing device. A decision algorithm such as described in FIG. 6A and FIG. 6B may be followed to determine the capabilities, functionality, characteristics and/or type of accessory device plugged into the jack 502.

Methodology

Figure 6A:
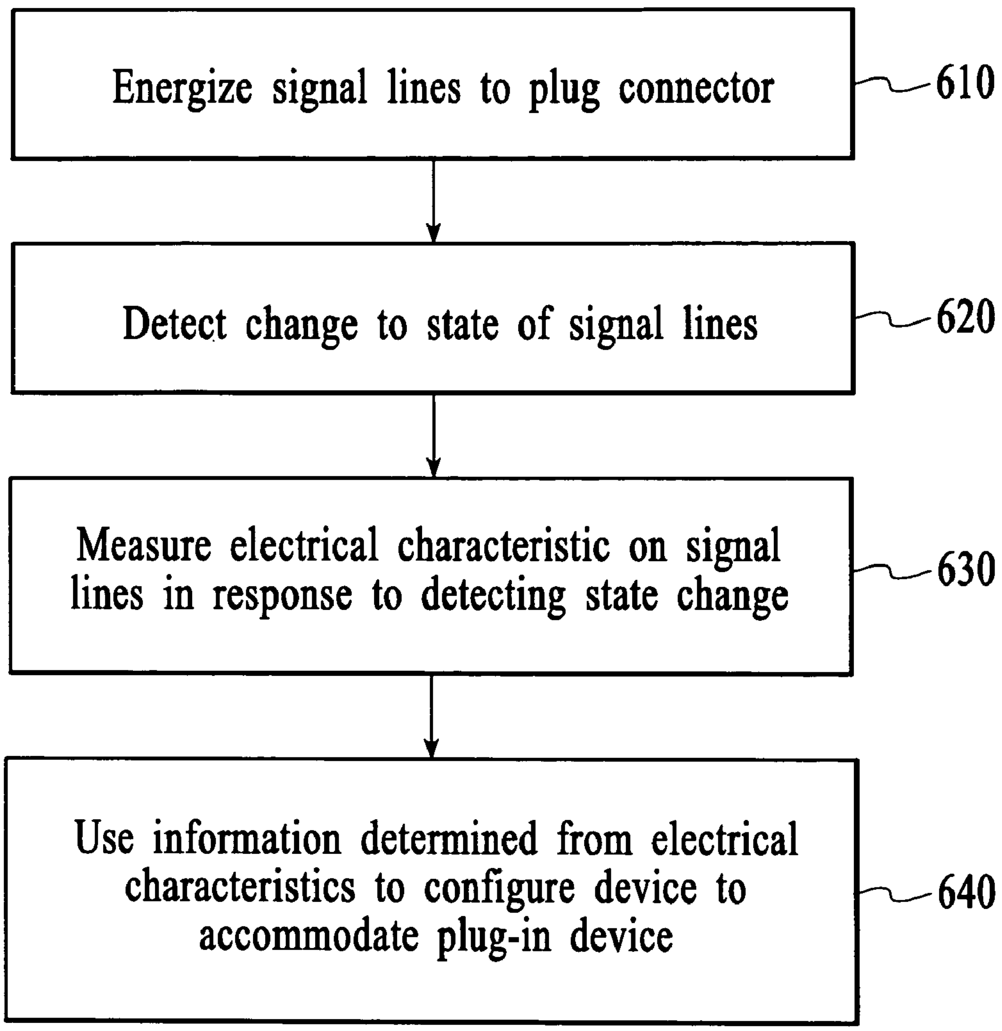
FIG. 6A illustrates a basic technique or method for providing support for numerous types of plug devices, under an embodiment of the invention.

FIG. 6A illustrates a basic technique or method for providing support for numerous types of plug devices, under an embodiment of the invention. A method or technique such as illustrated may be implemented on any computer machine or device in connection with a connector or connector system for receiving plug connectors. An example of a computing device on which a method such as described may be implemented is a mobile or portable computing device (smart phone, cellular phone, musical player). Reference made to numerals or elements described in other figures is for purpose of describing a suitable component for performing a step or sub-step of the method.

In step 610, signal lines that extend to poles or other contacts within the jack 502 are placed in an energized state. The energized state may be a default state, existing anytime the jack is unused and the device on which the jack is provided is in operable state (e.g. either "on" or in "sleep" mode). In one implementation, four signal lines are provided, to support 3-pin plug connectors and 4-pin plug connectors.

Anytime a plug connector is inserted into the jack 502, the default state of the energized signal lines is changed. In step 620, a change in the state of the energized signal lines is detected, meaning a plug connector of another device was inserted into the jack 502.

In step 630, one or more electrical characteristics on the signal lines are measured in response to the state change. For example, the voltage and/or impedance of the signal lines 505 may be measured after insertion of a plug connector. Embodiments such as described assume that different types of accessory devices produce different electrical characteristics. For example, a 4-pin plug connector has three non-ground signal lines. A 3-pin stereo headphone has two channels with similar voltage level changes. An example of the determinations made as part of this step is described in greater detail with FIG. 6B.

Step 640 provides that information corresponding to electrical measurements made from the signal lines 505 is used to configure the computing device and/or the connector system, in order to accommodate and fully support the accessory device that uses the plug connector. In an embodiment, a look-up table (such as shown by FIG. 8) is used to correlate the electrical measurements to information for configuring the connector system and/or computing device.

Figure 6B:
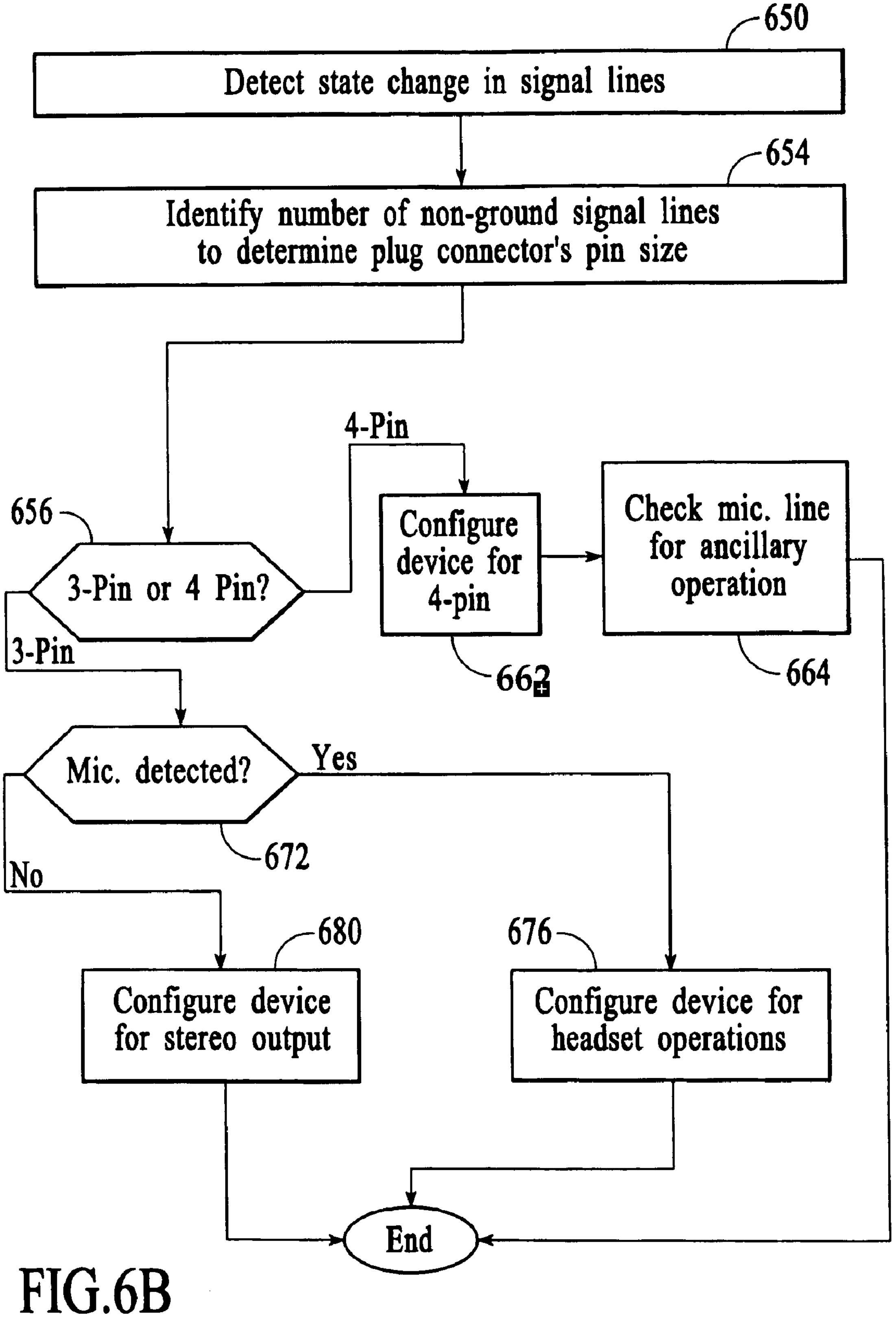
FIG. 6B illustrates another technique or method in which a computing device determines the type of plug connector and the accessory device for which the plug connector belongs too, under an embodiment of the invention.

FIG. 6B illustrates another technique or method in which a computing device determines the type of plug connector and the accessory device for which the plug connector belongs too, under an embodiment of the invention. A method such as described may be performed on any computing device that employs a connector system such as shown and described by FIG. 5. In particular, an embodiment shown in FIG. 6B determines whether there is a 3-pin or 4-pin plug connector connected to the jack 502, and the type of device used (headset with microphone, headphones, combination device).

Step 650, a detection is made as to whether the state of the signal lines 505 is changed. In an embodiment, one or more of the signal lines have a default energized state, so that coupling of the plug connector of another device will induce electrical changes that are detectable. For example, as described with FIG. 7, one signal line may be energized, and insertion of a plug connector may trigger a switch so that an associated signal line is charged in a differentiable manner. Thus, for example, the signal line may have a voltage that is identifiable.

In step 654, the number of non-ground signal lines is identified as part of a determination to determine the connector's pin size. In an embodiment described by FIG. 6B, a determination of step 656 is limited to one where the plug connector is 3-pin or 4-pin. Other embodiments may detect other plug connector pin sizes.

If the determination is that there are three non-ground signal lines needed, the determination is made in step 656 that a 4-pin plug connector is inserted in jack 502. The device is then made ready or configured for the 4-pin plug accessory in step 662. In an implementation, the device on which the jack 502 resides has as a default accessory device configuration for the 4-pin accessory device. In an embodiment illustrated with FIG. 6B, this device is assumed to be a headset with microphone with audio stereo capabilities.

If use of other 4-pin plug connector devices is contemplated, additional steps may be performed to identify characteristics of the accessory device with the plug connector. If microphone operations are assumed, an optional step 664 may provide independently checking the microphone signal line for a fluctuation or additional state change indicating an ancillary microphone function. An ancillary microphone function may correspond to push button features provided on some accessory devices, such as "answer" phone call or "hang up" phone call.

If the determination in step 656 is that a 3-pin plug connector is inserted into the jack 502, subsequent steps determine the capabilities of the accessory device for which the plug connector is provided. In an embodiment illustrated by FIG. 6B, two general types of accessory devices are contemplated for 3-pin plug connectors: devices with microphones (headset) and devices for audio output with no microphones (headphones). In step 672, the determination is made as to whether the accessory device has a microphone. The determination may be made by voltage and/or impedance characteristics one or both of the non-ground signal lines.

One embodiment provides that if the impedance levels of both non-ground signal lines are substantially equal (e.g. within 80% of one another), then the determination of step 672 is that a non-microphone accessory device is present. Step 676 is performed, in which the device is configured for use with stereo headphones or other audio output mechanism. Configuration of the device for stereo output may include, for example, the following: (i) assigning a signal line that could be used to receive microphone input to output audio instead; and/or (ii) outputting the audio equally on two signal lines.

Otherwise, following the determination of step 672, step 680 may provide for the device to be configured for microphone operations. In one embodiment, the microphone input line is identified, and its operational parameters for use with the device in various states is established.

While an embodiment such as show in FIG. 6B illustrates a determination of 3-pin or 4-pin plug connector, it should be noted that with further developments of additional accessory devices and connector plug technology, five or more pin devices may be developed. The determination as to the number of pins a connector has, when the possibility exists for five or more, may be made in a manner that is similar to what is shown in FIG. 6B. An assumption may be made that the jack dimension (or adapter provided for it) accommodates the dimensions of the plug connector containing more than four pins. Furthermore, additional circuitry (particularly additional leads of the signal lines 505) are needed to accommodate such a multi-pin plug connector.

In addition, while FIG. 6B illustrates a determination of headset (with or without microphone control), headphone, or combination device, other embodiments may provide for additional determinations of device types. In particular, plug connectors with four or more pins may correlate to several types of accessory devices, having various types of functionality.

Device Detection and Configuration

Figure 7:
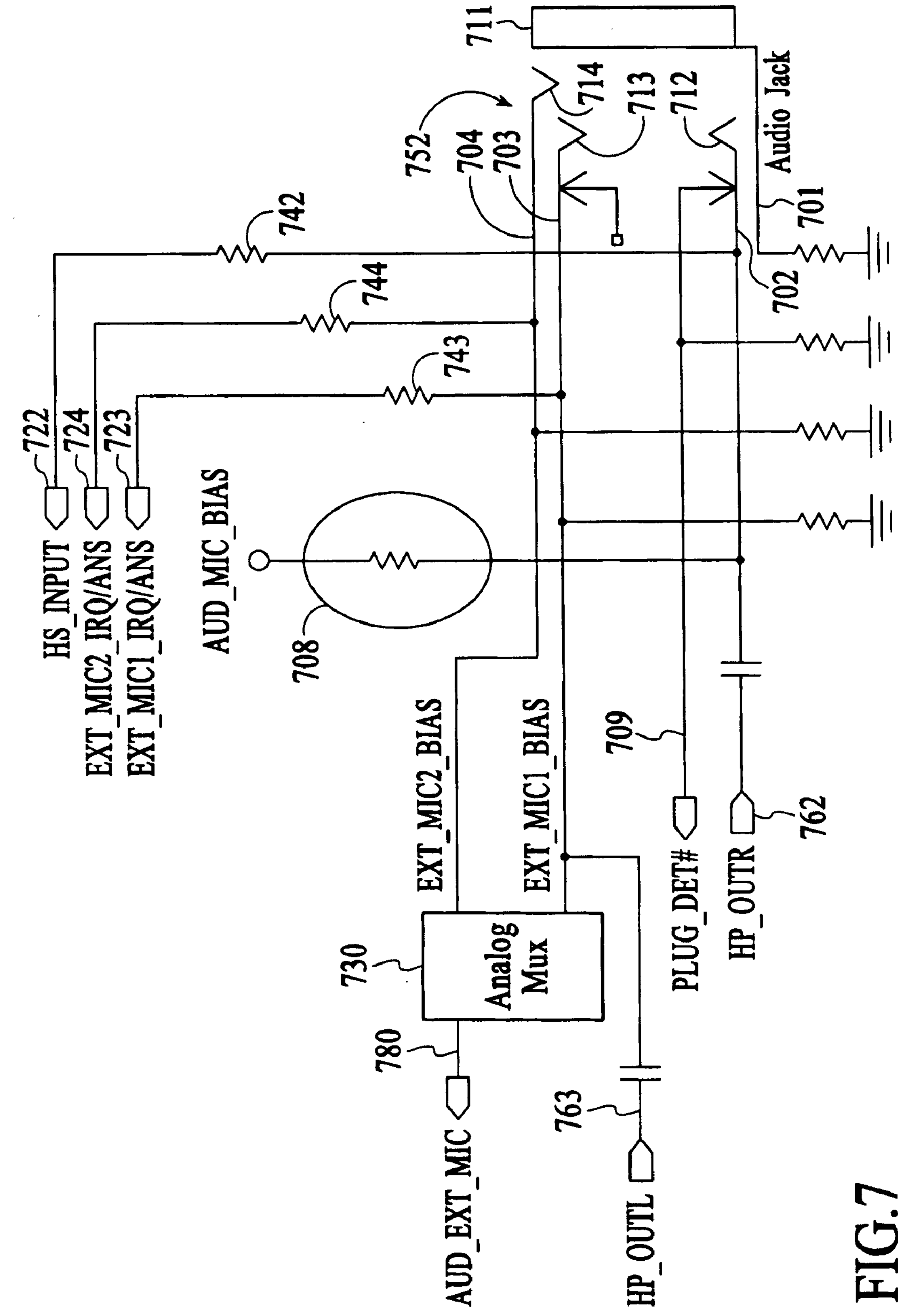
FIG. 7 is a circuit diagram for detecting accessory device characteristics from an inserted accessory device plug, according to one embodiment.

FIG. 7 is a circuit diagram for detecting accessory device characteristics from an inserted accessory device plug, according to one embodiment. An embodiment such as shown by FIG. 7 may correspond to an implementations of the monitoring mechanism 512, energizing/bias element 514, and ECMD 516 of FIG. 5. However, numerous other implementations exist for components and elements shown in FIG. 5.

Figure 1B:
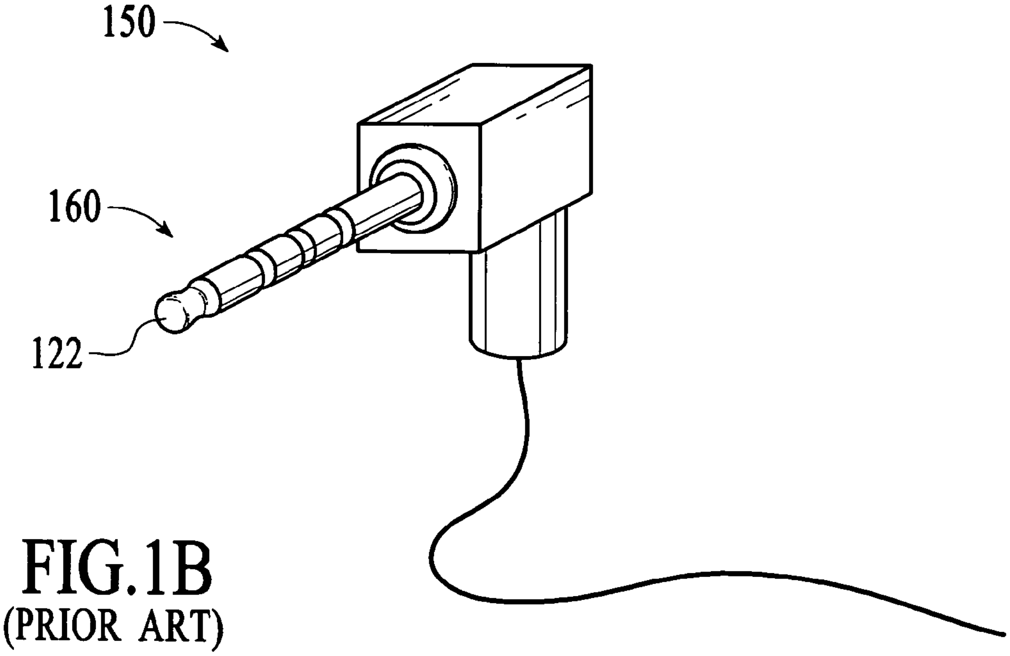
FIG.1B (PRIOR ART)
Figure 4:
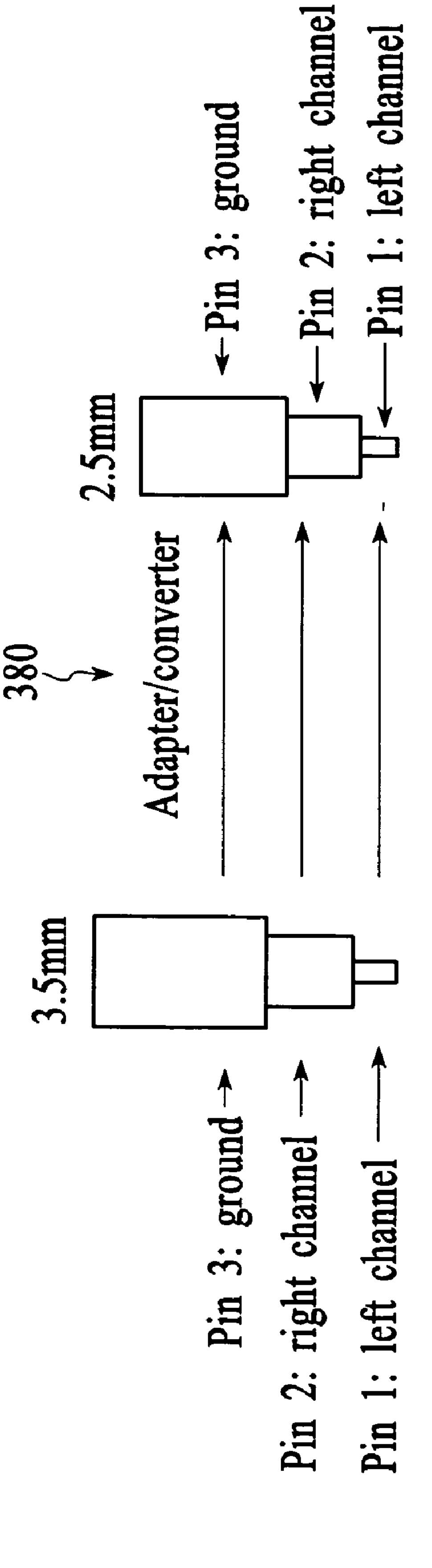
FIG.4 (PRIOR ART)
FIG. 4 is a diagram showing the affect of applying a size adapter to a prior art accessory plug.

In FIG. 7, a circuit is shown for (i) detecting the presence of a plug connector, and (ii) for determining information about a type of accessory device that uses the plug connector. In FIG. 7, a receptacle 752 (which may correspond to jack 502) is shown having contact points 711, 712, 713 and 714. The contact points 711, 712, 713 and 714 make electrical contact with corresponding pins of an inserted plug connector. As such, contact points 711, 712, 713 and 714 are positioned, for example, to meet each pin provided on one of the barrels 110, 160 as shown in FIG. 1A and FIG. 1B respectively. Signal lines 701, 702, 703 and 704 (which may correspond to signal lines 505) extend from the respective contact points 711, 712, 713 and 714. In one embodiment, four signal lines along with four contact points are used to accommodate both 3-pin and 4-pin connectors.

Signal line 702 is provided a bias voltage 708 that energizes the line as a default state. Insertion of a plug connector results in a switching event that causes a measurable variation to the associated signal line 709 (PLUG_DET). At the same time, the switching event distributes voltage to the other signal lines 702, 703, and 704. Signal line 702 may remain in an energized state, and a change to signal line 701 is reflected on associated signal line 709. A mechanical detect switch, such as described with embodiments and examples provided in this application, may correspond to a device that deflects contact 712, causing a detectable change on signal line 709. The resulting energization of the associated signal line 709 is detected, and recognized as corresponding to the insertion of the plug.

When the plug connector is inserted, the signal lines 701, 702, 703 and 704 serve dual purposes. When the plug connector is inserted, the signal lines 701, 702, 703 and 704 are the means by which data is exchanged with the plug connector. This includes audio signal output for one or more speaker components, and audio input for use with a microphone component.

At an initial moment just after insertion of the plug connector, however, the signal lines 701, 702, 703 and 704 also serve the purposes of (i) detecting plug connector insertion, and (ii) determining accessory device type. For the latter purpose, measurement signals are pulled from the signal lines 702, 703 and 704 (with signal line 701 corresponding to ground). A pull-up voltage 742 on the signal line 702 is used for a measured signal line 722 (HS_INPUT). A voltage pull-up 743 on the signal line 703 results in a measured signal line 723 (EXT_MIC1_IRQ/ANS). Likewise, a voltage pull-up 744 on the signal line 704 results in a measured signal line 724 (EXT_MIC2_IRQ/ANS). Measured signal lines 722, 723, and 724 provide voltage values that are used to determine the properties of the accessory device for the inserted plug connector. The voltage pull-ups 742, 743 and 744 make voltages on each corresponding measured signal line 722, 723, 724 proportional to an impedance provided on the corresponding signal line 702, 703, 704 when the load is present.

Values detected on the measured signal lines 722, 723 and 724 may be used to determine the type of accessory device used with the plug connector inserted into the receptacle 752. Specifically, the determinations that may be made include: (i) whether the inserted plug connector has 3-pins or 4-pins, (ii) whether a microphone is present, and (iii) if no microphone is present, the properties of the accessory device (assuming earbuds or speaker-only device).

FIG. 8 illustrates a look-up table 800 for identifying the type of accessory device that uses the plug connector inserted into receptacle 752. In an embodiment shown, look-up table 800 uses voltage detected from measured signal line 722 (HS_INPUT), measured signal line 723 (EXT_MIC1_IRQ/ANS), and measured signal line 724 (EXT_MIC2_IRQ/ANS). The values contained in the lookup table 800 can be used to determine the type of accessory device in use.

In one embodiment, the first determination made is whether a 4-pin plug connector is being used. The 4-pin plug connector may correspond to a headset. The determination is made if measured signal line 724 (EXT_MIC2_IRQ/ANS) is non-ground.

If a 3-pin plug connector is being used, a differentiation is made as to whether the accessory device includes a microphone or not. In an embodiment shown, an assumption is made that the 3-pin plug connector either includes earbuds (speakers only) or a speaker and a microphone. In an embodiment, the insertion of the plug connector with an inactive microphone results in an identifiable microphone voltage being measured on signal line 723 (HS_INPUT). Otherwise, stereo speaker device is assumed, and the non-zero voltage values from measured signal line 723 (EXT_MIC1_IRQ/ANS) and measured signal line 722 (HS_INPUT) indicate the properties of the speakers in use.

Stereo accessories that use passive speakers may have different impedances: e.g. 8 Ω, 16 Ω, 32Ω, or 150Ω. Powered or amplified speakers may have similar low impedance, or they may have 2 kΩ, 10 kΩ, or other higher impedances. This wide range of impedances is a potential source of ambiguity for a decision algorithm such as described above.

According to an embodiment such as shown, stereo speakers are identified through measurement of the relative impedance of the left and right channels. This avoids differentiating the relatively small absolute impedance values. Thus, the distinguishing characteristic of stereo accessories is leveraged, that being the right and left channels of the device present the same impedance to the used measured signal lines 722, 723. Consequently, the application processor needs to measure the impedance on measured signal line 723 (EXT_MIC1_IRQ/ANS) and measured signal line 722 (HS_INPUT). If they are the same, then, as described below, an embodiment assumes that a stereo accessory has been inserted and routes the right and left audio channels appropriately. If the impedance on measured signal line 723 (EXT_MIC1_IRQ/ANS) and measured signal line 722 (HS_INPUT) are different, then software assumes that a mono-aural cell phone headset has been inserted and routes the microphone signal to signal line 703.

After the plug connector is inserted and its properties are determined, the signal lines 701, 702, 703 and 704 are used to operate the device. Information determined form the measured signal lines 722, 723 and 724 is used to configure the output configuration for how the signal lines are used. For example, signal line 702 includes a speaker output function, provided by the audio output 762 (HP_OUTR). In one embodiment, signal lines 702 and 703 may provide a speaker or audio out function provided by audio output (R) 762 and audio output 763(L). Thus, the signal lines 702 and 703 may have dual roles for input and output. If the detected device is a stereo speaker, for example, the audio output 762 and 763 may be routed to signal lines 702 and 703. Other examples of how the audio outputs 762. 763 on the signal lines 702, 703 may be used are provided below. The value of the audio outputs 762 763 may be configured so as to be based on the detected impedance values of the speakers (see e.g. Table 8).

The third signal line 703 and the fourth signal line 704 are fed to an analog multiplexer 730, for the case where the accessory device using the plug connector for the receptacle 752 includes a microphone. If the measured signal lines 722, 723, and 724 confirm the presence of the microphone, then multiplexer 730 drives one of the signal lines 703 (EXT_MIC1_BIAS) or signal line 704 (EXT_MIC2_BIAS) to be the external microphone signal 780.

Figure 9:
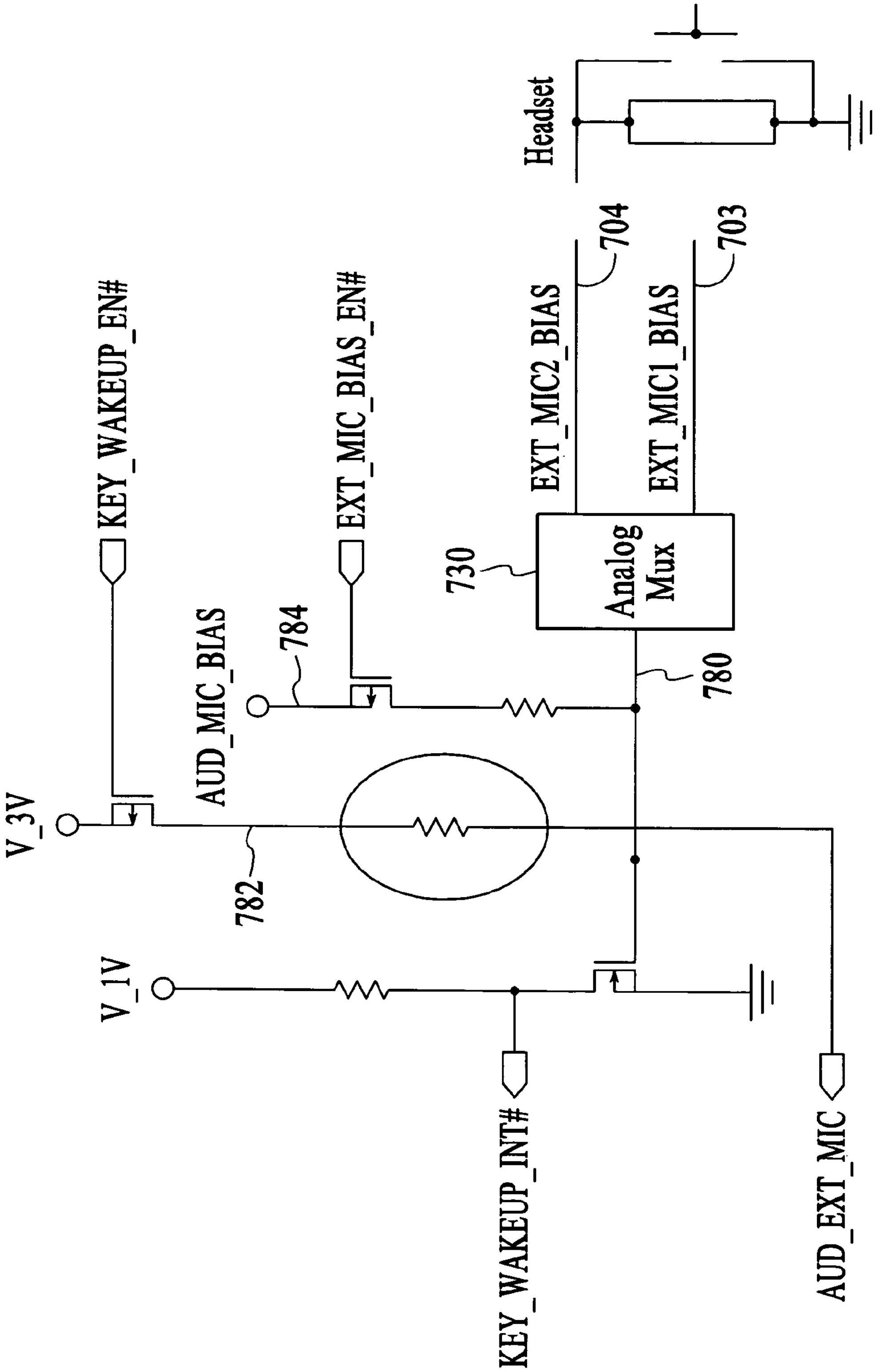
FIG. 9 illustrates separate configurations that may be implemented to accommodate use of one or more microphone signals, based on the power state of the device, under an embodiment of the invention.

FIG. 9 illustrates separate configurations that may be implemented to accommodate use of the microphone signal 780 based on the power state of the device. If the device is in a low-power or sleep mode, then a biased signal 782 may be applied to the microphone signal 780. If the device is in an operational mode, another biased signal 784 is applied suited for the operational device state.

Signal Line Configuration Examples

The following presents different signal line configurations that may result from insertion of plug connectors from different types of accessory devices into a receptacle configured under one or more embodiments of the invention. With the examples provided, reference may be made to elements of FIG. 7 for purpose of showing a component, element, configuration or context for the example being described.

Figure 10A:
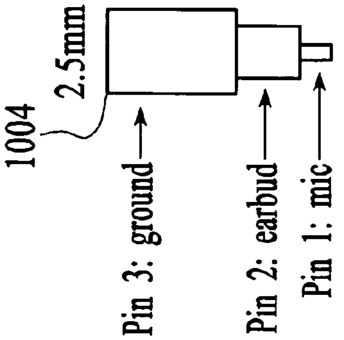
FIG. 10A and FIG. 10B are diagrams of possible connection configurations for a headset accessory device that can be used with a cellular device, according to an embodiment of the invention.
Figure 10B:
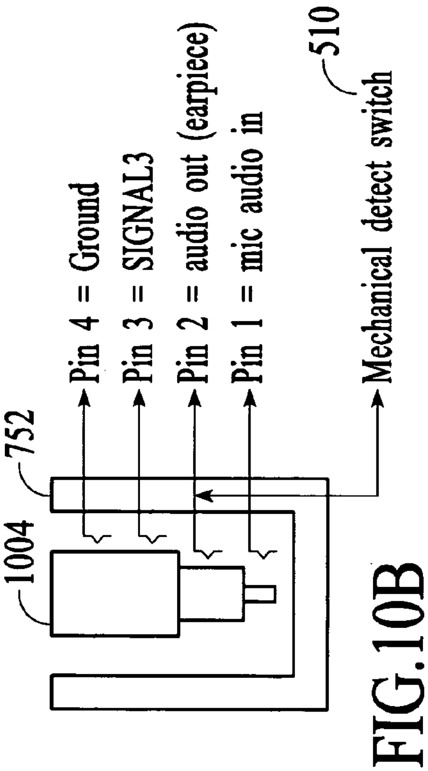

FIGS. 10A and 10B are diagrams of possible connection configurations for a headset accessory device that can be used with a cellular device, according to an embodiment of the invention. FIG. 10A shows a standard 2.5 mm cellular telephone headset plug 1004 with a pin 1 assigned to a microphone, a pin 2 assigned to an earbud, and a pin 3 assigned to ground. FIG. 10B shows the standard cellular telephone headset plug 1004 inserted into the receptacle 752 (see FIG. 7). The signal on pin 1 (corresponding to signal line 703 (EXT_MIC1_BIAS)) is interpreted as microphone audio in. The signal on pin 2 (corresponding to signal line 702 (HP_OUTR)) is used for audio output to the earpiece. Pin 3 may be shorted with pin 4 on insertion of the plug connector, so that only pin 1 and pin 2 carry signals for measurement. A mechanical detect switch 1005 may detect the presence of the plug 1004 on insertion into the receptacle 752.

Figure 11A:
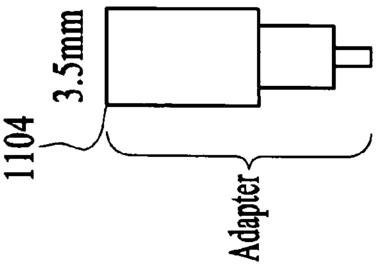
FIG. 11A-11C are diagrams illustrating a configuration a stereo audio accessory inserted into a receptacle connector, under an embodiment of the invention.
Figure 11B:
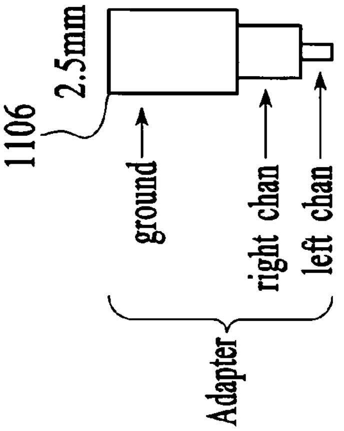
Figure 11C:
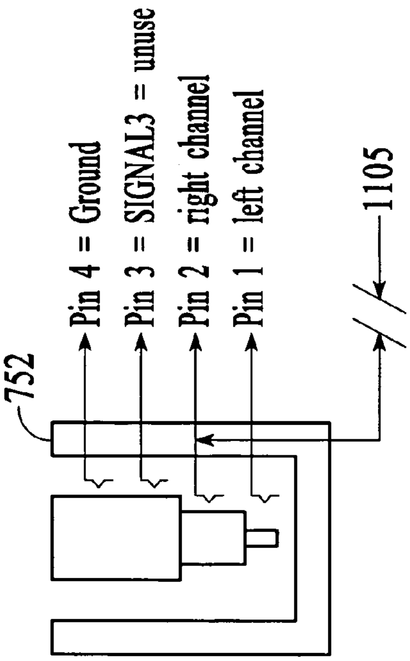

FIG. 11A-11C are diagrams illustrating a configuration a stereo audio accessory inserted into the receptacle 752. The stereo accessory may be equipped with a 3.5 mm plug 1104, as shown in FIG. 11A, that is inserted in a 3.5 mm-2.5 mm adapter 1106, as shown in FIG. 11B. The adapter 1106 has pin 1 assigned to left channel audio, pin 2 assigned to right channel audio, and pin 3 assigned to ground. FIG. 11C shows the adapter 1106 inserted into the receptacle 752. When inserted, the signal on pin 1 (corresponding to signal line 703 (EXT_MIC1_BIAS)) is used for left channel audio output. The signal on pin 2 (corresponding to signal line 702 (HP_OUTR)) is used for right channel audio output. Pin 3 is shorted with pin 4 on insertion of the plug connector, so that only pin 1 and pin 2 carry signals for measurement. A mechanical detect switch 1105 may detect the presence of the plug 1104 (via the adapter 1106) on insertion into the receptacle 752.

Figure 12A:
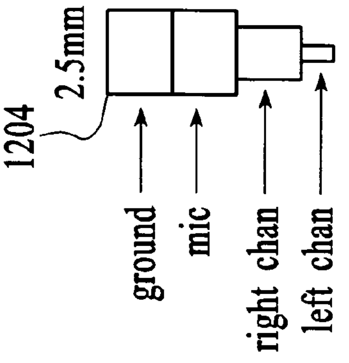
FIG. 12A and FIG. 12B are diagrams illustrating a configuration of a combination headphone/headset accessory inserted into a receptacle connector, under an embodiment of the invention.
Figure 12B:
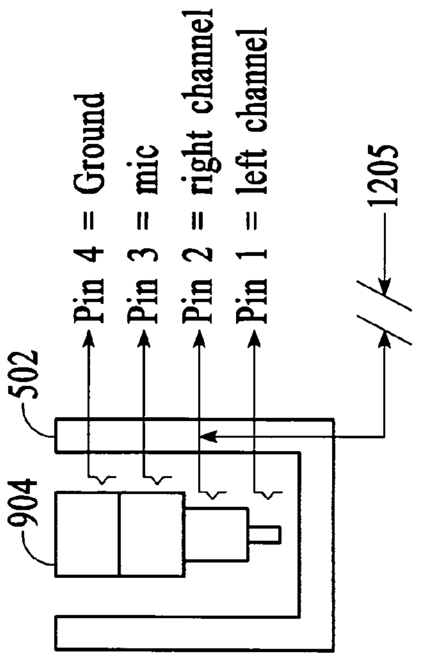

FIGS. 12A and 12B are diagrams illustrating a configuration of a combination headphone/headset accessory inserted into the receptacle 752. The combination headphone/headset accessory has a 2.5 mm plug 1204 as shown in FIG. 12A. FIG. 12B shows the plug 1204 inserted into the receptacle 752. When inserted, the signal on pin 1 (corresponding to signal line 703 (EXT_MIC1_BIAS)) is interpreted as left channel audio output. The signal on pin 2 (corresponding to signal line 702 (HP_OUTR)) is interpreted as right channel audio output. The signal on pin 3 (corresponding to signal line 704 (EXT_MIC2_BIAS)) is used to carry the microphone signal. Pin 4 is grounded. A mechanical detect switch 1205 may detect the presence of the plug on insertion into the receptacle 752.

Figure 13A:
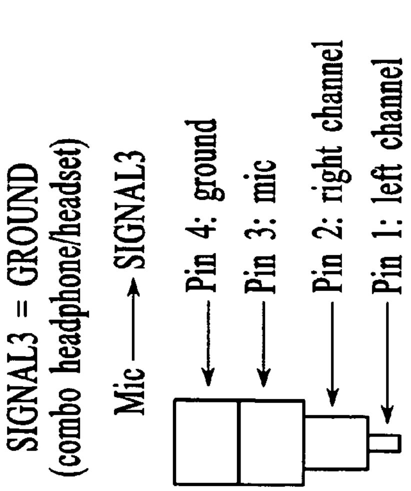
FIG. 13A-13C illustrate a priority scheme for use of a microphone source when an accessory device is mated with a computing device, under an embodiment of the invention.
Figure 13B:
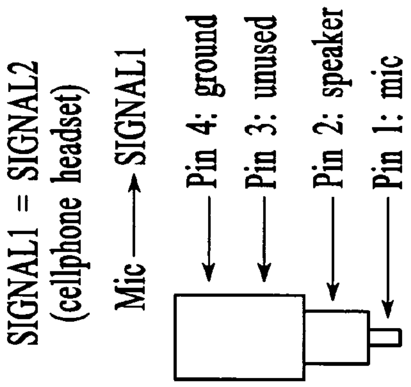
Figure 13C:
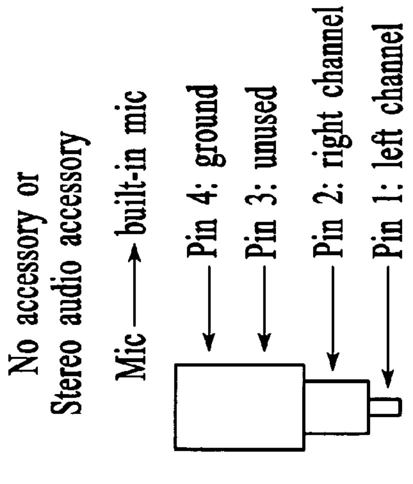

An embodiment may provide for a computing device that can be used with three different microphone sources. For example, in an embodiment, a computing device may be equipped with a built-in microphone, or be capable of microphone input from two different pins of its receptacle 752 (See FIG. 7). Thus, the computing device may be used with custom combination headphone/headset accessory that uses the signal line 704 (EXT_MIC2_BIAS), or with a standard cellular telephone headset accessory that uses the signal line 703 (EXT_MIC1_BIAS). Any of the three potential microphone sources can be detected and used with a priority scheme shown by FIG. 13A-13C, when viewed sequentially from left to right.

1. Measure signal 3. If signal 3 (corresponding to signal line 704 (EXT_MIC2_BIAS)) does not equal ground, then a microphone has been detected (combination headphone/headset). The microphone is routed to signal 3.

2. Measure signal 1 and signal 2. If signal 1 (corresponding to signal line 703 (EXT_MIC1_BIAS)) does not equal signal 2 (corresponding to signal line 702 (HS_INPUT), then a microphone signal is deemed to exist on signal 1. This configuration is for a non-stereo headset. The microphone is routed to signal 1.

3. Otherwise, the device 500 (FIG. 5) uses its built-in microphone.

Given the configuration examples provided above, the following provides an example of how audio output from device 500 may be configured based on a determination of the type of accessory device.

1. As the audio accessory is detected by the monitoring mechanism 512, identify the type of accessory as explained above.

2. If no audio input (e.g., microphone input) is necessary, always route the audio paths assuming a stereo accessory is connected. This ensures that stereo functionality is always available to the user by default.

3. When the microphone input is required (e.g., on an active call), route the audio paths as described with reference to FIG. 13A-13C.

With reference to FIG. 5, for example, the priority described above may be the result of a processor or other component of the device 500 receiving the configuration data 525.

Device Hardware Diagram

Figure 14:
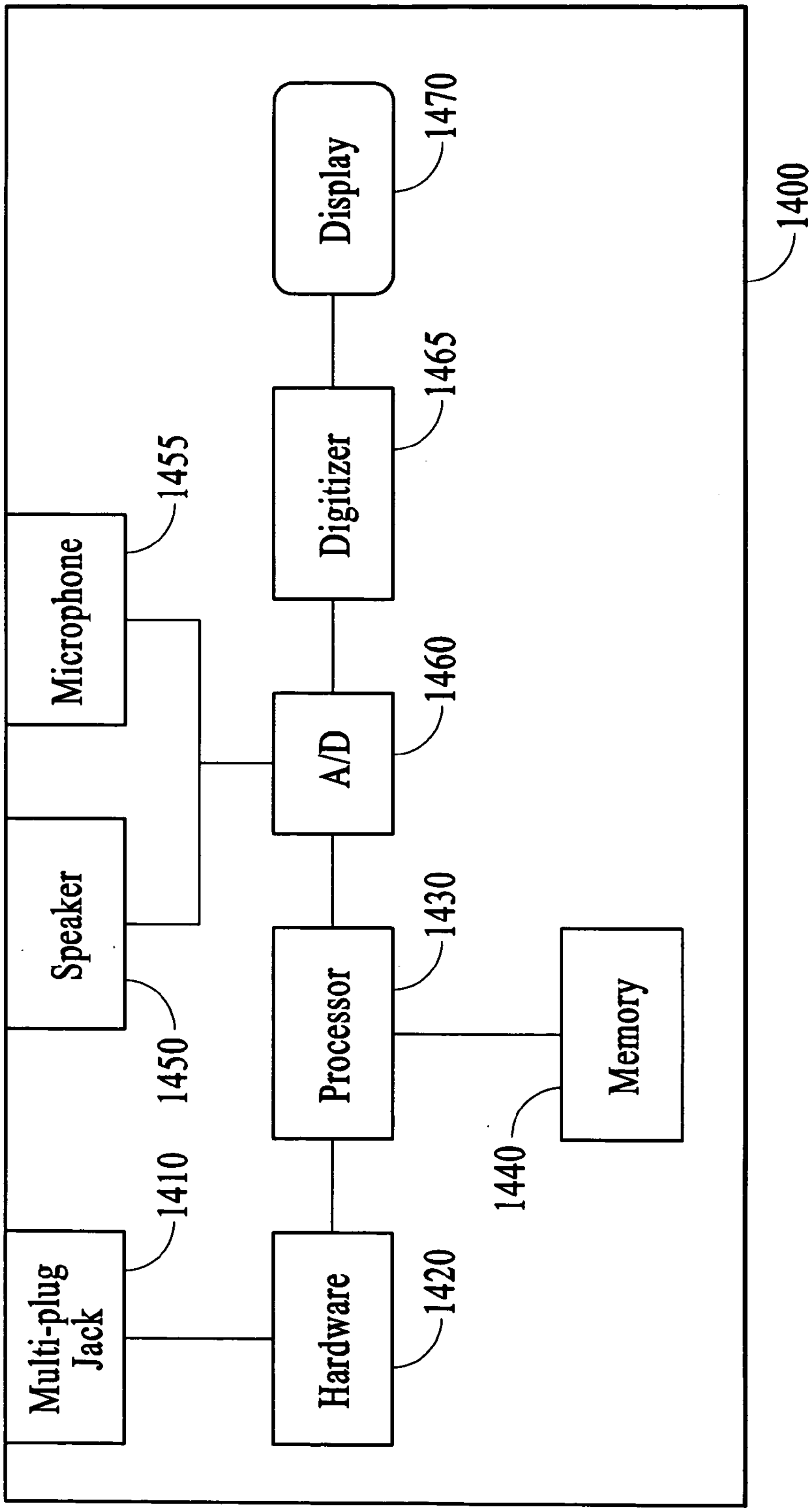
FIG. 14 is a simplified block diagram of an electronic device that carries an embodiment of the invention.

FIG. 14 is a simplified block diagram of an electronic device that carries an embodiment of the invention. A computing device 1400 may include a multi-plug jack 1410 and hardware 1420 (including circuits) that are used with or form part of the intelligent accessory module 504 (e.g. see FIG. 5). One or both elements communicate with a processor 1430 (or multiple processing resources) as well as memory components 1440. Memory components 1440 may include one or both volatile and non-volatile memory. In one embodiment, the hardware 1420 includes the monitoring mechanism 512, the bias mechanism 514, and physical elements of the ECMD 514. The processor 1430 may execute software such as used by the accessory knowledge component 518. Numerous other variations are possible. The processor 1430 may operate multiple components, including for example, a display 1470 and digitizer 1465 that form a contact-sensitive display assembly. A speaker 1450 and microphone 1455 may be provided and communicable with processor 1430. One or more analog-digital converters 1460 may enable the processor to receive and/or output analog data via speaker 1450, microphone 1455, digitizer 1465 and/or display 1470. The processor 1430 may use programs and instructions stored in memory to respond to signals generated from the jack 502. For example, an embodiment may provide that the combination of processor 1430 and hardware 1420 detect a four-pin jack. In one embodiment, the processor 1430 may be responsive in executing instructions that cause display 1470 to provide a display message (e.g. “speaker headphones on”) or trigger the microphone 1455 to be in listen mode.

Alternative Embodiments

While embodiments described herein focus on headphone accessories and output devices such as speakers, one or more embodiments may utilize hardware and/or software such as shown and described to detect and configure a computing device to conform with other types of accessory devices. For example, a digital musical player (e.g. IPOD produced by APPLE CORPORATION) or video player (e.g. CAMCORDER produced by the SONY CORPORATION) may utilize plug connectors for media feeds that include audio and/or video. The type of device (e.g. rich media provider) may be detected by the computing device, as equipped under an embodiment of the invention. Thus, in the case of the MP3 player that is connected to a computing device, insertion of the plug connector causes the computing device to recognize and configure itself to accommodate the rich media input from the device. As an example, the computing device may automatically open a media player to receive the audio data and to even make one or more file copies of the audio and/or video data provided by the accessory device (e.g. “rip a song”).

Aspects of the invention described above may be implemented as functionality programmed into any of a variety of circuitry, including but not limited to programmable logic devices (PLDs), such as field programmable gate arrays (FPGAs), programmable array logic (PAL) devices, electrically programmable logic and memory devices and standard cell-based devices, as well as application specific integrated circuits (ASICs) and fully custom integrated circuits. Some other possibilities for implementing aspects of the invention include: microcontrollers with memory (such as electronically erasable programmable read only memory (EEPROM)), embedded microprocessors, firmware, software, etc. Furthermore, aspects of the invention may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method for operating a computing device, the method comprising:

detecting a plug mated with a receptacle connector of the computing device, wherein the plug is used by an accessory device;

detecting one or more electrical characteristics produced on one or more signal lines that extend to the receptacle connector as a result of the plug being mated with the receptacle connector;

making a determination that (i) a type of the accessory device that uses the plug has a microphone source, and (ii) the microphone source has one or more ancillary microphone functions;

wherein making the determination that the microphone source has one or more ancillary microphone functions is performed using the one or more detected electrical characteristics on the one or more signal lines; and configuring the computing device to accommodate the type of the accessory device that is a microphone source and the microphone source has one or more ancillary microphone functions.

2. The method of claim 1, wherein detecting one or more electrical characteristics includes measuring an impedance produced on one or more signal lines that extend to the receptacle connector.

3. The method of claim 2, wherein measuring an impedance produced on one or more signal lines includes comparing measured impedance values on two or more signal lines, wherein each of the two or more signal lines corresponds to one of a plurality of pins of the plug and the corresponding pin of each of the two or more signal lines is different.

4. The method of claim 1, wherein configuring the computing device further comprises assigning one of a plurality of signal lines to each of a plurality of pins of the plug and producing a bias voltage on the plurality of signal lines.

5. The method of claim 1, wherein making a determination that a type of accessory device that uses the plug is a microphone source by performing steps comprising:

measuring, on the plurality of signal lines, a signal originating from each of a first pin, second pin, and third pin of the plug; and making the determination that the accessory device has a combination headphone/headset in response to the signal originating from the third pin being other than ground.

6. The method of claim 1, wherein making a determination that a type of accessory device that uses the plug has the microphone source includes:

measuring, on the plurality of signal lines, a signal originating from each of a first pin, second pin, and third pin of the plug; and making the determination that the accessory device has a non-stereo headset in response to a measurement of the signal on the first pin being different than a measurement of the second pin.

7. The method of claim 1, wherein making a determination that a type of accessory device that uses the plug has the microphone source includes:

measuring, on the plurality of signal lines, a signal originating from each of a first pin, second pin, and third pin of the plug;

making the determination of one of (i) the accessory device has the combination headphone/headset in response to the signal originating from the third pin being other than ground; (ii) the accessory device has a non-stereo headset in response to a measurement of the signal on the first pin being different than a measurement of the second pin; and identifying one of the first pin, second pin and third pin as the microphone source depending on whether the accessory device includes the combination headphone/headset or non-stereo headset.

8. The method of claim 1, wherein configuring the computing device to accommodate the type of the accessory device includes:

if the combination headphone/headset is detected, routing a microphone signal to the third pin;

if the non-stereo headset is detected, routing the microphone signal to the first pin; and otherwise, using a built-in microphone of the mobile computing device.

9. A connector system for a computing device, the connector system comprising:

a receptacle configured to receive a plug connector of an accessory device;

a measurement module configured to measure one or more electrical characteristics off of one or more signal lines that extend from the receptacle upon insertion of the plug connector into the receptacle; and a knowledge module configured to generate configuration data for a processor of the computing device, the configuration data being determined from data corresponding to the one or more electrical characteristics measured by the measurement module, wherein the configuration data indicates a use of one or more of the signal lines that extend from the receptacle;

wherein at least one of the knowledge module or the measurement module are each configured to measure an electrical characteristic of one or more signal lines in order to detect that the accessory device is of a type having either a microphone source or no microphone source and whether the type of accessory device is also one of (i) a non-stereo headset, (ii) a stereo headset, or (iii) a combination headphone/headset;

wherein at least one of the knowledge module or the measurement module are configured to use the measured electrical characteristic of the one or more signal lines to determine, when the type of accessory device has the microphone source, whether the microphone source has one or more ancillary microphone functions;

wherein the knowledge module is configured to (i) generate the configuration data for the processor of the computing device to accommodate the type of the accessory device and, (ii) if the accessory device is the microphone source with the ancillary functions, enable use of the ancillary microphone functions.

10. The connector system of claim 9, wherein the measurement module is configured to measure the electrical characteristic corresponding to an impedance of one or more signal lines in order to detect the type of the accessory device.

11. The connector system of claim 9, wherein the measurement module is configured to detect a number of non-grounded signal lines, and wherein the knowledge module makes a determination as to the type of the accessory device based on the number of non-grounded signal lines.

12. The connector system of claim 11, wherein the measurement module is configured to make a determination as to whether the accessory device has three pins or four pins based on detecting either two non-ground signal lines or three-non-ground signal lines.

13. The connector system of claim 9, wherein the knowledge module is configured to determine the type of the accessory device by identifying an electrical characteristic measured by the measurement module that corresponds to at least two signal lines being substantially equal to one another.

14. The connector system of claim 13, wherein the configuration data generated by the knowledge module indicates at least that use of two or more signal lines is for audio output in stereo.

15. The connector system of claim 9, wherein the measurement module includes a combination of pull-up circuit elements that tie in to each of the one or more signal lines to enhance the affects of resistive load applied to that signal line.

16. The connector system of claim 9, wherein the knowledge module includes a look-up table that correlates one or more measured electrical characteristic on one or more of the signal lines with a type of accessory device.

17. The connector system of claim 9, wherein the knowledge module is implemented with software that executes on a processor of the computing device.

18. The connector system of claim 10, further comprising a mechanical detect switch to detect insertion of the plug connector.

19. A computing device comprising:

a receptacle configured to receive a plug connector of an accessory device;

a plurality of signal lines that extend to the receptacle; and processing resources that are configured to:

identify information about the accessory device based on a measured electrical characteristic on one or more of the plurality of signal lines, wherein the measured electrical characteristic is a result of the at least one of the plurality of signal lines being electrically connected with a pin of the plug connector upon insertion of the plug connector into the receptacle; and wherein the processing resources are configured to use the information to make a determination that the accessory device is of a type that corresponds to anyone of a plurality of types, the plurality of accessory types including at least (i) a microphone source with non-stereo headset, (ii) a stereo headset without a microphone source, or (iii) a microphones source with a combination headphone/headset; and wherein when the determination is that the type of the microphone source with non-stereo headset or the microphone source with the combination, the processing resources are configured to use the measured electrical characteristic on one or more of the plurality of signal lines to make a determination as to whether the microphone source has any ancillary microphone functions based on the measured electrical characteristics.

20. The computing device of claim 19, wherein at least one of the plurality of signal lines is energized prior to insertion of the plug connector, and wherein the processing resources are configured to detect a change to one or more of the plurality of signal lines as a result of the at least one energized signal line being contacted by the plug connector.

21. The computing device of claim 19, wherein the processing resources are configured to identify information about the accessory device by determining a number of non-ground signal lines in the plurality of signal lines after insertion of the plug connector.

22. The computing device of claim 19, wherein the processing resources are configured to identify information about the accessory device by determining that an impedance characteristic on at least two of the plurality of signal lines is substantially equal.

23. The method of claim 1, wherein making the determination that the microphone source has one or more ancillary microphone functions includes detecting electrical characteristics that correspond to a fluctuation or additional state change on the one or more signal lines, the fluctuation or additional state change being indicating of an ancillary microphone function.

24. The method of claim 1, wherein the ancillary microphone function corresponds to features provided by the accessory device for answering or hanging up a phone call.

25. The connector system of claim 9, wherein the measurement module is configured to detect electrical characteristics that correspond to a fluctuation or additional state change on one or more signal lines, and wherein the knowledge module makes a determination as whether the fluctuation or additional state change indicates one or more ancillary microphone functions.

26. The connector system of claim 9, wherein the ancillary microphone function corresponds to features provided by the accessory device for answering or hanging up a phone call.

27. The computing device of claim 19, wherein the processing resources are configured to identify information about whether the microphone source has one or more ancillary microphone functions by detecting electrical characteristics that correspond to a fluctuation or additional state change on the one or more signal lines, the fluctuation or additional state change being indicating of an ancillary microphone function.

28. The computing device of claim 19, wherein the ancillary microphone function corresponds to features provided by the accessory device for answering or hanging up a phone call.

* * * * *

UNITED STATES PATENT AND TRADEMARK OFFICE

CERTIFICATE OF CORRECTION

PATENT NO. : 7,836,216 B2
APPLICATION NO. : 11/210328
DATED : November 16, 2010
INVENTOR(S) : Mostafa Kashi et al.

It is certified that error appears in the above-identified patent and that said Letters Patent is hereby corrected as shown below:

On Sheet 6 of 12, in FIG. 6B, delete "  " and insert -- 662 --, therefor.

In column 16, line 16, in Claim 18, delete "claim 10," and insert -- claim 9, --, therefor.

Signed and Sealed this
Nineteenth Day of July, 2011

David J. Kappos
*Director of the United States Patent and Trademark Office*